United States Patent
Kim et al.

(10) Patent No.: US 11,349,675 B2
(45) Date of Patent: May 31, 2022

(54) TAMPER-RESISTANT AND SCALABLE MUTUAL AUTHENTICATION FOR MACHINE-TO-MACHINE DEVICES

(71) Applicant: Alcatel-Lucent USA Inc., Murray Hill, NJ (US)

(72) Inventors: Young Jin Kim, Basking Ridge, NJ (US); Vladimir Y. Kolesnikov, Jersey City, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 2686 days.

(21) Appl. No.: 14/057,218

(22) Filed: Oct. 18, 2013

(65) Prior Publication Data

US 2015/0113275 A1   Apr. 23, 2015

(51) Int. Cl.
  *H04L 9/32*   (2006.01)
  *H04L 9/08*   (2006.01)

(52) U.S. Cl.
  CPC .......... *H04L 9/3273* (2013.01); *H04L 9/0822* (2013.01); *H04L 9/0825* (2013.01);
  (Continued)

(58) Field of Classification Search
  CPC ..... H04W 12/06; H04W 12/08; H04W 12/04; H04W 4/70; H04L 9/3263; H04L 9/32;
  (Continued)

(56) References Cited

U.S. PATENT DOCUMENTS 8,863,256 B1 * 10/2014 Addepalli ............. H04W 4/046
                                                                    726/7
9,288,059 B2 *  3/2016 Nix ......................... H04W 4/70
(Continued)

OTHER PUBLICATIONS

Chris Woodyard, "Obama Pushes Electric Cars, Battery Power This Week," USA Today, Jul. 2010, 3 pages.
(Continued)

*Primary Examiner* — Tae K Kim
(74) *Attorney, Agent, or Firm* — Ryan, Mason & Lewis, LLP (57) ABSTRACT

An authentication request message is sent from a first computing device to a second computing device, wherein the first computing device and the second computing device communicate via a machine-to-machine communication protocol, and wherein the authentication request comprises a token issued by the second computing device and stored in a key obfuscation block of the first computing device. A challenge message is received at the first computing device from the second computing device. In response to the challenge message, a session key is computed at the key obfuscation block of the first computing device, wherein the session key is computed based on a secret shared between the first computing device and the second computing device. Upon generating the session key, the first computing device extracts a value from the challenge message and generates an authentication delegate based on the extracted value. The authentication delegate is sent from the first computing
(Continued)

device to a third computing device for verification to allow the first computing device access to the third computing device.

24 Claims, 8 Drawing Sheets (52) U.S. Cl.
CPC .......... *H04L 9/0877* (2013.01); *H04L 9/0891* (2013.01); *H04L 9/3234* (2013.01); *H04L 9/3278* (2013.01); *H04L 2209/16* (2013.01)

(58) Field of Classification Search
CPC ..... H04L 9/321; H04L 9/3273; H04L 9/0822; H04L 9/0825; H04L 9/0877; H04L 9/0891; H04L 9/3234; H04L 9/3278
See application file for complete search history.

(56) References Cited

U.S. PATENT DOCUMENTS

| | | | | |
|---|---|---|---|---|
| 9,923,716 | B2* | 3/2018 | El Mghazli | H04L 9/0844 |
| 2003/0039361 | A1* | 2/2003 | Hawkes | G06F 21/10 |
| | | | | 380/278 |
| 2003/0063750 | A1* | 4/2003 | Medvinsky | G06F 21/10 |
| | | | | 380/277 |
| 2003/0200431 | A1* | 10/2003 | Stirbu | H04L 9/3271 |
| | | | | 713/168 |
| 2003/0200433 | A1* | 10/2003 | Stirbu | H04L 9/0844 |
| | | | | 713/169 |
| 2003/0233546 | A1* | 12/2003 | Blom | G06Q 20/02 |
| | | | | 713/168 |
| 2004/0078571 | A1* | 4/2004 | Haverinen | H04L 9/0869 |
| | | | | 713/168 |
| 2004/0153667 | A1* | 8/2004 | Kastelewicz | H04W 12/06 |
| | | | | 726/9 |
| 2005/0017068 | A1* | 1/2005 | Zalewski | G06Q 20/04 |
| | | | | 235/380 |
| 2005/0223217 | A1* | 10/2005 | Howard | G06F 21/31 |
| | | | | 713/155 |
| 2006/0205388 | A1* | 9/2006 | Semple | H04L 63/0853 |
| | | | | 455/411 |
| 2006/0282662 | A1* | 12/2006 | Whitcomb | G06F 21/33 |
| | | | | 713/156 |
| 2007/0143835 | A1* | 6/2007 | Cameron | G06F 21/33 |
| | | | | 726/9 |
| 2008/0109331 | A1* | 5/2008 | Stadelmann | G06Q 20/123 |
| | | | | 705/34 |
| 2008/0109657 | A1* | 5/2008 | Bajaj | H04L 9/3213 |
| | | | | 713/168 |
| 2008/0120700 | A1* | 5/2008 | Pandey | H04L 63/08 |
| | | | | 726/4 |
| 2008/0123851 | A1* | 5/2008 | Guccione | H04L 63/061 |
| | | | | 380/270 |
| 2009/0013381 | A1* | 1/2009 | Torvinen | H04L 9/0838 |
| | | | | 726/3 |
| 2009/0220091 | A1* | 9/2009 | Howard | H04L 63/0428 |
| | | | | 380/277 |
| 2009/0259849 | A1* | 10/2009 | Faynberg | H04L 9/3213 |
| | | | | 713/169 |
| 2009/0278492 | A1* | 11/2009 | Shimizu | B60L 11/1816 |
| | | | | 320/108 |
| 2009/0292918 | A1* | 11/2009 | Mori | G06F 21/31 |
| | | | | 713/168 |
| 2010/0185357 | A1* | 7/2010 | Mizumachi | B60L 11/1816 |
| | | | | 701/31.4 |
| 2010/0262703 | A1* | 10/2010 | Faynberg | H04L 63/0815 |
| | | | | 709/229 |
| 2011/0016321 | A1* | 1/2011 | Sundaram | H04L 63/061 |
| | | | | 713/171 |
| 2011/0022222 | A1* | 1/2011 | Tonegawa | B60L 8/003 |
| | | | | 700/232 |
| 2011/0066309 | A1* | 3/2011 | Matsuoka | B60L 11/1824 |
| | | | | 701/22 |
| 2011/0083169 | A1* | 4/2011 | Moeller | H04L 63/0853 |
| | | | | 726/5 |
| 2011/0140835 | A1* | 6/2011 | Ishibashi | B60L 11/1824 |
| | | | | 340/5.2 |
| 2011/0144844 | A1* | 6/2011 | Ishibashi | B60L 11/1846 |
| | | | | 701/22 |
| 2011/0145899 | A1* | 6/2011 | Cao | H04L 9/3213 |
| | | | | 726/7 |
| 2011/0167272 | A1* | 7/2011 | Kolesnikov | H04L 9/3242 |
| | | | | 713/171 |
| 2011/0191842 | A1* | 8/2011 | Lindholm | H04L 9/3271 |
| | | | | 726/9 |
| 2011/0219428 | A1* | 9/2011 | Ishibashi | H04L 63/0884 |
| | | | | 726/3 |
| 2011/0246769 | A1* | 10/2011 | Wilson | G06F 21/81 |
| | | | | 713/168 |
| 2011/0265158 | A1* | 10/2011 | Cha | G06F 21/57 |
| | | | | 726/6 |
| 2011/0271099 | A1* | 11/2011 | Preiss | H04L 63/0807 |
| | | | | 713/155 |
| 2011/0279083 | A1* | 11/2011 | Asai | B60L 11/1816 |
| | | | | 320/109 |
| 2012/0023568 | A1* | 1/2012 | Cha | G06F 21/335 |
| | | | | 726/10 |
| 2012/0137132 | A1* | 5/2012 | Le Saint | H04L 9/0827 |
| | | | | 713/171 |
| 2012/0191242 | A1* | 7/2012 | Cutwater | G06Q 30/06 |
| | | | | 700/236 |
| 2012/0191600 | A1* | 7/2012 | Boot | B60L 11/1848 |
| | | | | 705/40 |
| 2012/0278869 | A1* | 11/2012 | Guccione | H04L 63/102 |
| | | | | 726/5 |
| 2012/0291124 | A1* | 11/2012 | Maria | H04L 63/08 |
| | | | | 726/22 |
| 2012/0297473 | A1* | 11/2012 | Case | H04L 63/0823 |
| | | | | 726/10 |
| 2013/0012168 | A1* | 1/2013 | Rajadurai | H04L 9/0822 |
| | | | | 455/411 |
| 2013/0015809 | A1* | 1/2013 | Frey | B60L 11/1824 |
| | | | | 320/106 |
| 2013/0029595 | A1* | 1/2013 | Widmer | H04B 5/0031 |
| | | | | 455/39 |
| 2013/0038424 | A1* | 2/2013 | Katar | H04L 67/125 |
| | | | | 340/5.8 |
| 2013/0067253 | A1* | 3/2013 | Tsuda | B60L 8/003 |
| | | | | 713/300 |
| 2013/0083926 | A1* | 4/2013 | Hughes | H04L 9/0836 |
| | | | | 380/278 |
| 2013/0091565 | A1* | 4/2013 | Kafer | B60L 11/1816 |
| | | | | 726/21 |
| 2013/0139235 | A1* | 5/2013 | Counterman | H04L 63/061 |
| | | | | 726/7 |
| 2013/0170644 | A1* | 7/2013 | Lambert | G06F 21/34 |
| | | | | 380/277 |
| 2013/0174222 | A1* | 7/2013 | Ogle | G06F 21/577 |
| | | | | 726/3 |
| 2013/0219472 | A1* | 8/2013 | Hsu | H04L 63/0815 |
| | | | | 726/4 |
| 2013/0318630 | A1* | 11/2013 | Lam | G06F 21/60 |
| | | | | 726/28 |
| 2014/0036873 | A1* | 2/2014 | Cheng | H04W 36/0022 |
| | | | | 370/331 |
| 2014/0093074 | A1* | 4/2014 | Gotze | H04L 9/0866 |
| | | | | 380/45 |
| 2014/0095286 | A1* | 4/2014 | Drewry | G06Q 30/02 |
| | | | | 705/14.26 |
| 2014/0189807 | A1* | 7/2014 | Cahill | G06F 21/41 |
| | | | | 726/4 |
| 2014/0329502 | A1* | 11/2014 | Lee | H04W 12/06 |
| | | | | 455/411 |
| 2015/0095648 | A1* | 4/2015 | Nix | H04W 4/70 |
| | | | | 713/170 |

(56) References Cited

U.S. PATENT DOCUMENTS

| | | | | |
|---|---|---|---|---|
| 2015/0106616 | A1* | 4/2015 | Nix | H04W 4/70 713/156 |
| 2015/0295905 | A1* | 10/2015 | Leicher | H04W 12/06 726/4 |
| 2015/0332029 | A1* | 11/2015 | Coxe | H04L 63/0815 726/9 |

OTHER PUBLICATIONS

J.A.P. Lopes et al., "Integration of Electric Vehicles in the Electric Power System," Proceedings of the IEEE, Jan. 2011, pp. 168-183, vol. 99, No. 1.

MIT Energy Initiative, "Chapter 5: The Impact of Distributed Generation and Electric Vehicles," the Future of Energy Grid, http://web.mit.edu/mitei/research/studies/the-electric-grid-2011.shtml, 2011, pp. 109-126.

NXP, "Protecting Next-Generation Smart Card ICs with SRAM-Based PUFs," PUF—Physical Unclonable Functions, http://www.nxp.com/documents/other/75017366.pdf, 2013, 8 pages.

B. Gassend et al., "Silicon Physical Random Functions," Proceedings of the 9th ACM Conference on Computer and Communications Security (CCS), Nov. 2002, pp. 148-160.

M. Nabeel et al., "Authentication and Key Management for Advanced Metering Infrastructures Utilizing Physically Unclonable Functions," IEEE Third International Conference on Smart Grid Communications (SmartGridComm), Nov. 2012, pp. 324-329, Tainan, Taiwan.

M. Garcia-Martin et al., "Diameter Session Initiation Protocol (SIP) Application," Network Working Group, Request for Comments: 4740, Nov. 2006, 72 pages.

J. Franks et al., "HTTP Authentication: Basic and Digest Access Authentication," Network Working Group, Request for Comments: 2617, Jun. 1999, 34 pages.

T. Dierks et al., "The Transport Layer Security (TLS) Protocol, Version 1.2," Network Working Group, Request for Comments: 5246, Aug. 2008, 104 pages.

M. Bauer et a., "Packet-Oriented Communications Protocols for Smart Grid Services Over Low-Speed PLC," IEEE International Symposium on Power Line Communications and its Applications (ISPLC), Mar.-Apr. 2009, pp. 89-94.

E. Barker et al., "NIST SP 800-56A: Recommendation for Pair-Wise Key Establishment Schemes Using Discrete Logarithm Cryptography (Revised)," National Institute of Standards and Technology (NIST), Mar. 2007, 14 pages.

National Institute of Standards and Technology (NIST), "Announcing the Advanced Encryption Standard (AES)," Federal Information Processing Standards Publication 197, Nov. 2001, 51 pages.

H. Krawczyk et al., "HMAC: Keyed-Hashing for Message Authentication," Network Working Group, Request for Comments: 2104, Feb. 1997, 11 pages.

B. Jansen et al., "Architecture and Communication of an Electric Vehicle Virtual Power Plant," First IEEE International Conference on Smart Grid Communications (SmartGridComm), Oct. 2010, pp. 149-154.

\* cited by examiner

TAMPER-RESISTANT AND SCALABLE MUTUAL AUTHENTICATION FOR MACHINE-TO-MACHINE DEVICES

FIELD

The present application relates generally to communication networks and, more particularly, to techniques for providing tamper-resistant and scalable mutual authentication for machine-to-machine devices.

BACKGROUND

Due to advances in battery technologies and concerns about oil depletion, air pollution, and global warming, several national and state governments have established policies and incentives to promote the development and deployment of plug-in electric vehicles (EVs) including pure battery electric vehicles and plug-in hybrid electric vehicles (PHEVs). For example, the U.S. government has pledged 2.4 billion dollars in federal grants for EVs and batteries. Further, under the low-emission vehicle program of CARB (California Air Resources Board), tax credits are offered for reducing the net purchase price of EVs.

One major factor influencing the recent increase in EV rollout is the deployment of plug-in charging infrastructures including communication facilities. However, the success of this deployment is dependent on the methods used for EV charging via plug-in charging facilities and the impact on grid stability. Uncontrolled random EV charging will likely cause grid instability unless power distribution infrastructure is significantly improved.

SUMMARY

Embodiments of the invention provide tamper-resistant and scalable mutual authentication for machine-to-machine devices. While not limited thereto, such authentication techniques are particularly suitable for use with devices involved in controlled electric vehicle charging operations.

For example, in one embodiment, a method comprises the following steps. An authentication request message is sent from a first computing device to a second computing device, wherein the first computing device and the second computing device communicate via a machine-to-machine communication protocol, and wherein the authentication request comprises a token issued by the second computing device and stored in a key obfuscation block of the first computing device. A challenge message is received at the first computing device from the second computing device. In response to the challenge message, a session key is computed at the key obfuscation block of the first computing device, wherein the session key is computed based on a secret shared between the first computing device and the second computing device. Upon generating the session key, the first computing device extracts a value from the challenge message and generates an authentication delegate based on the extracted value. The authentication delegate is sent from the first computing device to a third computing device for verification to allow the first computing device access to the third computing device.

In one embodiment, the first computing device is a client device, the second computing device is an authentication server, and the third computing device is an application server. For example, the method authenticates a client device associated with an electric vehicle by an authentication server associated with a grid charging infrastructure, wherein the client device and the authentication server communicate via a machine-to-machine communication protocol, and wherein the authentication comprises use of a token issued by the authentication server and stored in a key obfuscation block of the client device, such that, once the client device is authenticated via the token, the client device is able to access a charging station associated with the grid charging infrastructure.

These and other objects, features and advantages of the present invention will become apparent from the following detailed description of illustrative embodiments thereof, which is to be read in connection with the accompanying drawings.

DETAILED DESCRIPTION

Embodiments of the invention will be described below in the context of illustrative communication protocols and network architectures in the context of electric vehicle charging applications. However, it is to be appreciated that embodiments of the invention are not limited to any particular communication protocols or network architectures. Rather, embodiments of the invention are applicable to any suitable communication environment where it would be desirable to provide tamper-resistant and scalable mutual authentication for machine-to-machine devices. By way of example only, embodiments of the invention can be applied to other machine-to-machine applications including, but not limited to, smart sensing applications and smart metering applications.

As used herein, the phrase "electric vehicles" comprises any vehicles whose mobility is driven at least in part with electric power, e.g., EVs, PHEVs, etc.

The phrase "communication network" as used herein is generally defined as any communication network or system capable of transferring one or more types of data.

In contrast to uncontrolled random EV charging as mentioned above in the background section, controllable EV charging can deal with grid instability issues when high EV deployment is integrated with renewable energy resources. However, it is realized here that a key element for controllable EV charging is that it requires secure vehicle to grid communications (VGC). An EV that is plugged into a grid for charging must be first authenticated, and then continuously and safely controlled during charging. So, for ensuring the reliability of controllable EV charging, VGC must be resilient to cyber-attacks. In particular, because EVs can be physically exposed to third-party adversaries, secret data including key information that are stored within the vehicles for authentication or message encryption may be revealed or cloned by invasive or non-invasive physical attacks or state-of-the-art tampering techniques. Such cyber-attacks could result in serious safety and economic hazards to both EVs and grids. Therefore, the protection of EV secret information from physical tampering as well as from communication channel attacks is necessary for reliable and cost-efficient grid operations.

There is no existing solution for security measures (specifically, tamper-resistant authentication) for large-scale EV charging control scenarios. Advantageously, illustrative embodiments of the invention address the EV authentication problem under hostile communication environments. First, we note that the charging control of plug-in EVs can be viewed as a mobile machine-to-machine (M2M) application. Then we show that, under this classification, there is no existing solution for M2M authentication schemes that can meet the requirements for mobile M2M communication environment. As such, illustrative embodiments advantageously provide a tamper-resistant and scalable mutual authentication framework (TSAF) that is based on two elements: a token (AT) for stateless authentications and a key obfuscation block (KoB) for protecting authentication key information of client devices. Moreover, TSAF addresses scalability, simplicity, and ease-of-management. Thus, TSAF can support large-scale and nomadic EV charging scenarios.

The EV charging control application exhibits the following characteristics on communication aspects. Firstly, it has M2M communication settings, compared to most Internet applications that typically have human-to-machine (or human-to-human) communication settings. For example, an EV's on-board charger (as a client communication device) exchanges charging-related message (i.e., battery status, charging scheduling info, etc.) with a charging controller or scheduler (as a server machine) of the grid to which the EV is connected for charging. Secondly, compared with other M2M applications such as smart metering, plug-in EV charging requires mobility support since an EV can be charged at different geographic locations under a grid or across multiple grids due to its nomadic behavior and its limited battery capacity. Lastly, as the number of EVs grows, plug-in EV charging will become part of the Internet of Things (IoTs). According to the projected EV rollout on US roads by 2030, the estimated number of EVs is less than 5 million in a conservative scenario and more than 40 million in an optimistic scenario. Further, the US government has targeted to deploy about 1 million electric vehicles by 2015.

Figure 1:
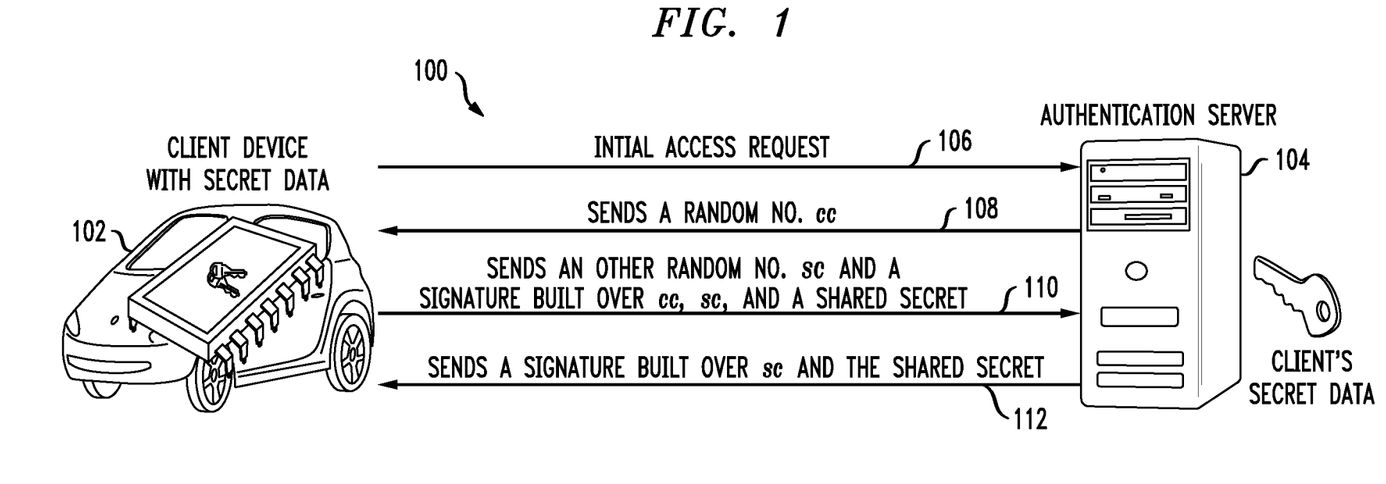
FIG. 1 illustrates a challenge-response-based mutual-authentication methodology between two parties.

Based on the characteristics described above, we can view the plug-in EV authentication problem as the mutual-authentication problem under large-scale mobile M2M communication settings. Consider FIG. 1, which shows a challenge-response-based mutual-authentication procedure 100 between two M2M parties; an EV C (102) and an authentication server S (104) that have shared a secret ss with each other. C contacts S since it must prove itself before charging (106). S then challenges C with a nonce cc (108) and subsequently C challenges S with a nonce se (110). For a given challenge, each party responds with a signature (derived from shared secret ss) to its peer (part of 110 for C's response and 112 for S's response). Finally, the two parties can trust each other if a received signature is verified with ss. Now, imagine that the shared secret ss kept in C is exposed to a third-party adversary, such as a malicious car owner or shop. Then, even with using the mutual authentication described above, both parties become vulnerable to security threats including man-in-the-middle attacks, client or server impersonations, and so on.

Therefore, we consider the question whether existing authentication approaches can strongly and efficiently protect client-side secret data against tamper attacks that can be developed under hostile M2M environments, and scalably and efficiently support mutual authentications under nomadic charging of EVs.

Before describing the TSAF approach according to illustrative embodiments of the invention, we briefly review existing approaches on M2M authentications, as relevant to the questions described above. Smart Card Integrated Circuit (IC) is known as the industry best practice since its embedded non-volatile memory is designed to protect secret data from unauthorized access. Such ICs are commonly used in credit cards, e-passports, subscriber identification modules, and so on. Smart-card-based solutions can be used for M2M authentications as well. However, its long-time sustainability is questionable under hostile M2M communications settings. EV communication devices have to withstand physical attacks for about 10 or more years. Some such attacks are: side channel attacks using information out of the power profile or the electromagnetic emanation; fault attacks such as disturbing the IC by applying laser light or a voltage glitch; reverse engineering of the IC parts or function blocks. There are countermeasures available today that hinder these attacks. However, the countermeasures are unlikely to be able to protect against future challenges.

Figure 2:
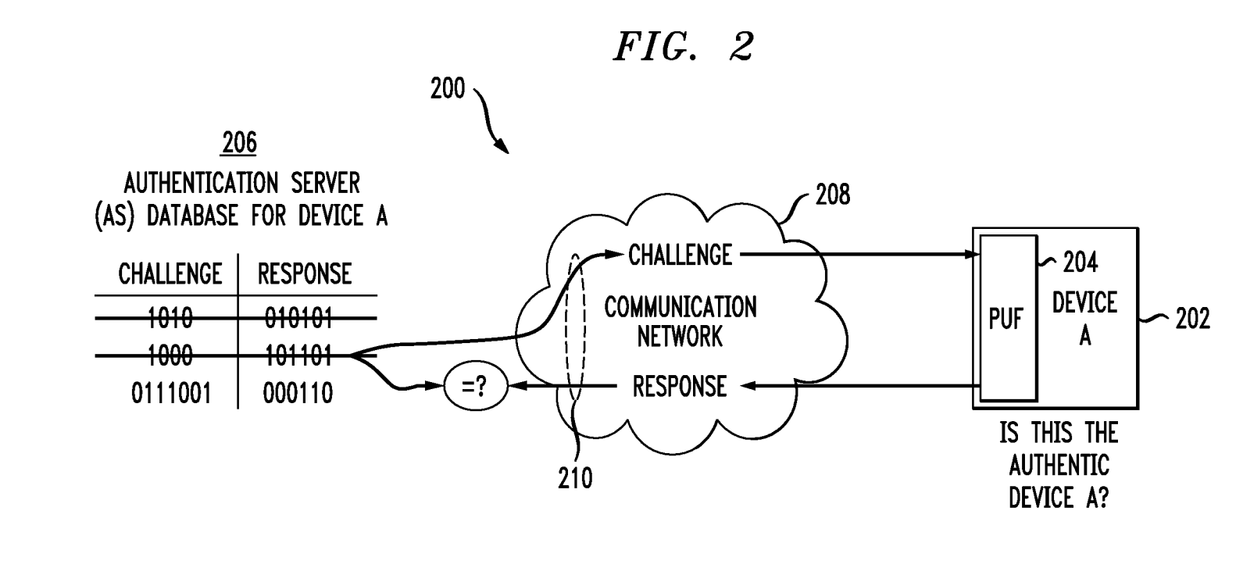
FIG. 2 illustrates a physically-unclonable function-based authentication methodology between two parties.

Physically-Unclonable Function (PUF) is a promising technology to protect client-side secret data. For a given input, a PUF built on an integrated circuit (IC) exploits the intrinsic and non-reproducible randomness inherited by the IC manufacturing process, to deterministically output a unique response. Due to this property, the probability of cloning a PUF is believed to be negligible. Consider FIG. 2 that shows a PUF-based authentication scheme 200. A client device (202) does not keep its secret data, but computes a response to a given challenge using its own PUF (204). So, in a client device, the theft of secret data by physical attacks is almost impossible. However, even though the PUF itself has no serious security flaw, most known PUF-based authentication schemes are limited in terms of mobility support, mutual authentication support, resilience, scalability, complexity, and cost. The PUF based authentication schemes has no way to verify a series of application servers that a client device migrates to over time due to its mobility; weak resilience/recovery against the exposure of a secret or its related data by improperly-configured client devices, brute-force attacks on communication channels, or improper server management. On using a PUF authentication scheme, the authentication server (206), coupled to the client device via a communication network (208), has an external database (DB) to effectively manage the high volume of client state due to the large number of clients and a corresponding set of challenge-response pairs (210) per client, as shown in FIG. 2. Using an external DB introduces security threats (e.g., compromised human personnel) and reliability issues (e.g., single point of failure). Today there are several schemes that can address these server related security issues. However, these schemes entail significant cost and management complexity.

Secure end-to-end protocol architectures for mutual-authentications between clients (i.e., EVs) and servers (i.e., EV charging scheduler) must be addressed as an independent problem to the client-side secret protection. We can classify all protocol architectures into a two-party model and a three-party model. In the former, an authentication server needs to be physically combined with an application server. As a result, this model is limited to accommodating mobile M2M communication environments where no client device is statically connected to a certain application server due to the mobility of clients. In contrast, in the latter, an authentication server does not need to combine with an application server and so there is no limitation to accommodate mobile M2M applications.

Figure 3:
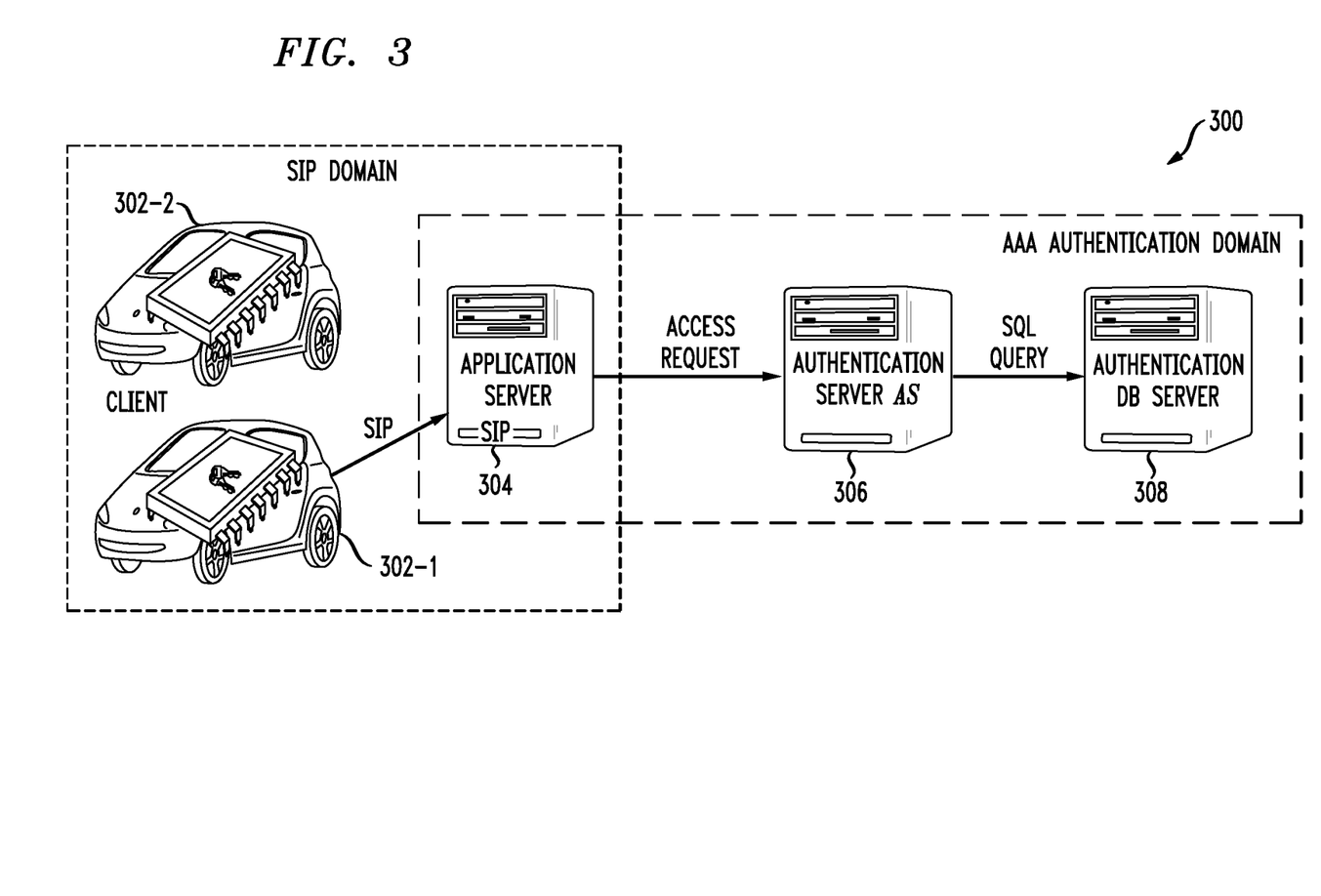
FIG. 3 illustrates a session initiation protocol and authentication, authorization, accounting-based methodology between two parties.

The combination of Session Initiation Protocol (SIP) and Authentication, Authorization, Accounting (AAA), that is a three-party model architecture (note that the combination of Extensible Authentication Protocol (EAP) and AAA is not proper for EV charging control since an application server must be combined with a Network Access Server (NAS) such as Wireless APs or Ethernet switches to ensure the end-to-end requirement), can be used for EV charging control scenarios as shown in network 300 of FIG. 3. However, the combination has the following limitations. Firstly, SIP and AAA, which were designed for supporting Internet Protocol (IP) multimedia applications, are unnecessarily heavy for the EV charging scenario as a purpose-built M2M setting since they have relatively large message size (caused by the HyperText Transmission Protocol (HTTP)-like protocol model), protocol complexity, and an unnecessarily-large number of physical/functional components. Secondly, AAA servers can verify clients using the extension of the HTTP Digest mechanism.

However, the HTTP Digest authentication has no mechanism for clients to verify the application server's identity and, as a result, server impersonations or man-in-the middle attacks can be developed. Further, the HTTP Digest authentication inherits the same security weaknesses that most password-based systems exhibit. Thirdly, the use of an extra mechanism such as Transport Layer Security (TLS) is required for mutual authentications. This, however, introduces new issues. In TLS, Public-Key-Infrastructure (PKI) certificates are required for server authentications and either PKI certificates or pre-shared keys are used for client authentications. Even so, a TLS client device is not free from physical attacks since it still keeps its own secret data, i.e., either a private key along with a client PKI certificate or a pre-shared key. Furthermore, it is difficult to exchange messages including PKI certificates (typically more than 1K bytes) over Power-Line Communication (PLC) or unlicensed radio that are typical communication technology for EV charging scenario. These communication technologies have significant delay constraints, and it can take on the order of minutes to deliver a message that is more than 1K bytes over a PLC network. Fourthly, when a client's secret is exposed to third-party adversaries, there is no recovery mechanism since there is no easy way to provision new secret data into the client device. Lastly, each authentication server typically needs external DB servers due to the large number of client devices, as shown in FIG. 3 (i.e., multiple client devices 302-1 and 302-2, application server 304, authentication server 306, and authentication DB server 308). DB servers can be exploited as server-side security holes since all client secret data may be exposed or modified by compromised personnel. Preventing unauthorized access to the DB additionally needs auditing software that inspects all DB access trials. Even so, if a privileged user is compromised, the auditing software may become non-effective.

To overcome the above and other limitations of existing authentication approaches, illustrative embodiments of the invention provide a tamper-resistant authentication framework, TSAF, for mobile M2M applications such as EV charging scenarios. As will be described in further detail herein, TSAF provides a stateless mutual authentication process. Exemplary properties of TSAF that distinguish it from existing approaches are as follows: first, mobility support is considered by design; importantly, no security state per client is stored by server, and as a result the need of external database for keeping client security state is removed. Further, expensive PKI certificates and public-key encryption are not used as they are often not required for purpose-built M2M applications, compared to general-purpose Internet applications.

In one embodiment, the TSAF includes four components: 1) an authentication server (AS) (e.g., it may be operated by NERC (North American Electric Reliability Corporation)); 2) an application server (i.e., grid EV charging scheduler) as a verification delegate; 3) a client device (i.e., EV); and 4) a key obfuscation block (KoB) given to the client. We assume that an application server already has secure communication sessions with authentication servers. Note that a purpose-built device for EV has a static association with an authentication server since it is typically operated under a single administrative domain such as the NERC.

For a client C that is about to access an application server P, its associated authentication server S challenges C for client verification and then delegates the final client verification step to P. Note that TSAF authentication servers by design do not keep any client state. Application server P verifies C's validity as S chooses P as a delegate of the client verification and then can establish an authenticated session with C for subsequently exchanging charging-related messages with C over the session. A KoB that is packaged with a client device computes and manages the client's credentials during our TSAF authentication process. Thus, client C retrieves credentials from its KoB at the start time of TSAF authentication process.

Figure 4:
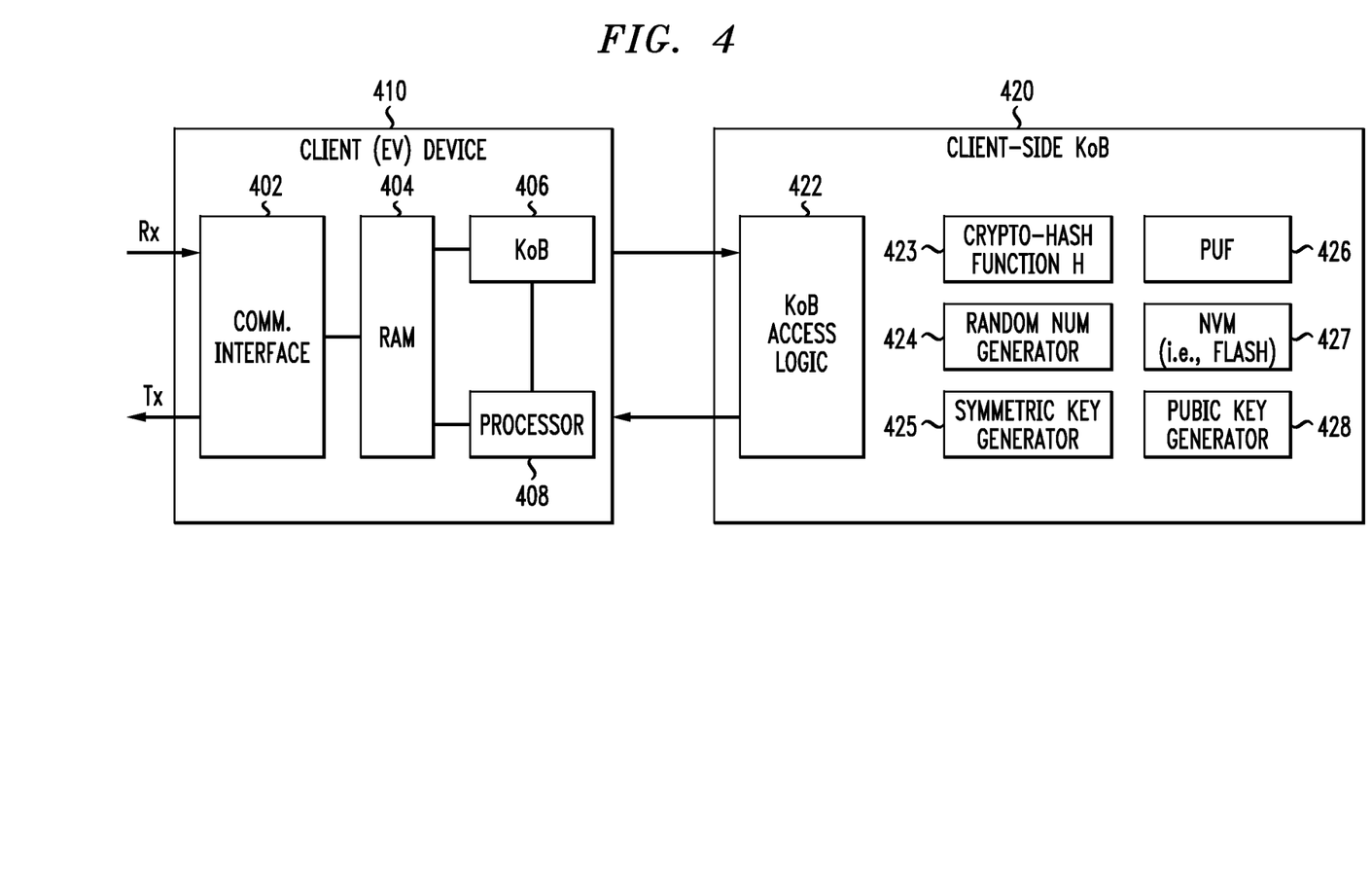
FIG. 4 illustrates a client device for a tamper-resistant and scalable mutual authentication framework, according to an embodiment of the invention.

As shown in FIG. 4, a client device 410 and a KoB 420 are depicted. As illustrated, the client device 410 includes a communication interface 412, random access memory (RAM) 404, a KoB 406 (which is further detailed in 420), and a processor 408. The client-side KoB 420 includes KoB access logic 422, crypto-hash function H 423, a random number generator 424, a symmetric key generator 425, a PUF 426, non-volatile memory (e.g., Flash memory) 427, and a public key generator 428.

Now, we discuss three key elements used in TSAF.

Authentication Token (AT): For a client C with identity id, its associated authentication server S issues an AT, which will be used to verify C's validity, to C. The AT is a cipher-text $T_{id}$ that contains id, the time is that $T_{id}$ is issued, C's public key pk, etc., and that is encrypted with a token key $tk_{id}$. C's first AT is issued in an off-line manner, e.g., S directly and safely accesses C to issue C's first AT. C's subsequent ATs are issued over communication networks. When C gets an AT issued by S, it writes the AT into its KoB. Note that all data of C is removed from S immediately after the AT issuing process.

Key Obfuscation Block: KoB is embedded into a system-on-a-chip (i.e., a smart card IC, a field-programmable gate array, etc.), and has a set of cryptographic logic (423, 424, 425, and 428), NVM (427), a PUF (426), and a set of KoB access logic (422) as base building blocks of the TSAF design (as shown in FIG. 4). A KoB provides its user (i.e., an EV) with the following interfaces:

Read-Current-Authentication-Token (RCT)
Generate-Public-Key (GPK)
Compute-Session-Key (CSK)
Write-First-Authentication-Token (WFT)
Update-Authentication-Token-Only (UTO)
Update-Authentication-Token-With Code (UTC)

By design, the user is allowed to access a KoB using only the KoB access interfaces.

Elliptic Curve Diffie-Hellman (ECDH) allows two parties (i.e., a pair of a client and an authentication server in TSAF), each having an elliptic curve public-private key pair, to know a shared secret without directly exchanging key materials.

We now present notation that are used throughout the remainder of the detailed description section. For a pair of an input m and a key k, $ENC_k(m)$ is an encryption form of m under k; $AES_k(m)$ is a new key derived from m where AES is an advanced encryption standard function. SECRET (k,m) is an ECDH key derived from a combination of k and m; $MAC_k(m)$ is a keyed-hash message authentication code of m under k; H(m) is a cryptographic hash value of m where H is a hash function such as secure hash algorithm (SHA); $m_1+m_2$ denotes a concatenation of messages $m_1$ and $m_2$.

For simplicity of presentation and understanding, we present the design of TSAF in a top-down manner. Basic ideas of TSAF, according to one embodiment, are first described in the context of FIG. 5. Further details of TSAF are described below in the context of FIGS. 6 and 7.

Figure 5:
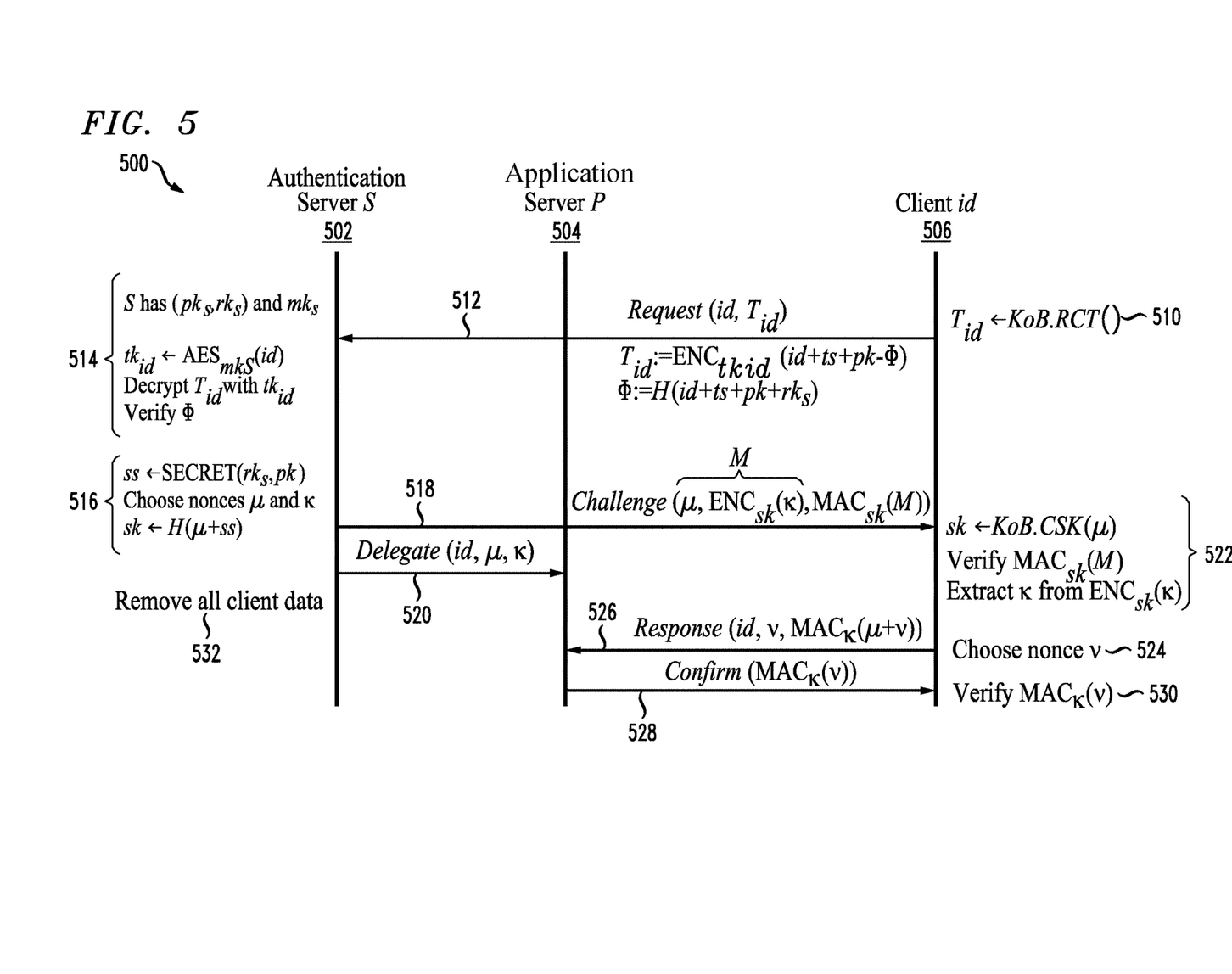
FIG. 5 illustrates a tamper-resistant and scalable mutual authentication methodology, according to an embodiment of the invention.

FIG. 5 illustrates a basic TSAF process 500 according to one illustrative embodiment. Here it is assumed that for a client C with identity id, its associated authentication server S keeps one single pair of public-private keys ($pk_S$, $rk_S$) and one single token master key $mk_S$, and C's KoB has an authentication token $T_{id}$ (that was issued by S) and can compute a session key sk. The detailed description about how $T_{id}$ is written into the KoB and how session key sk is computed will be further described below in the context of FIGS. 6 and 7.

In FIG. 5, the authentication server S is represented as 502, the application server P is represented as 504, and the client is represented as 506.

When C needs to prove itself for accessing an application server P, it first retrieves the current authentication token $T_{id}$ from its KoB (step 510). Then, C sends a request message to S via P (step 512). The message contains id and $T_{id}=ENC_{tkid}$ (id+ts+pk+Φ) where Φ is a hash value H(id+ts+pk+$rk_S$) required for the integrity of $T_{id}$.

Once S receives the message, it decrypts $T_{id}$ in step 514 with a token key $tk_{id}$ that is computed as follows: for token master key $mk_S$ and C's identity id, the token key $tk_{id}=AES_{mkS}$(id), and then verifies (also part of step 514) the hash value Φ for the integrity check of $T_{id}$. If the check is passed, S computes, in step 516, a shared secret ss from both its own private key $rk_S$ and C's public key pk that $T_{id}$ contains. Note that ECDH is used in this embodiment to compute the shared secret. S now chooses two random numbers μ and κ, and also derives a session key sk=H(μ+ss) (also part of step 516). Thereafter, S sends C a challenge message containing μ, $ENC_{sk}$ (K), and the message's MAC, in step 518. Concurrently, in step 520, S lets P know id, μ, and κ for delegating the final client verification step to P.

On receiving the message, in step 522, C asks its KoB to compute the session key sk and, if able, C can verify the received message's MAC with session key sk. Note that no third party adversary can derive session key sk without knowledge about shared secret ss. If the verification is passed, C can trust S and so extract nonce κ from $ENC_{sk}$ (K). Subsequently, it chooses a random number ν in step 524 and thus computes a MAC of μ and ν with κ (given by S). C sends, in step 526, a response message including the MAC to P that becomes the verification delegate.

On receiving the message, P verifies the received message with id, μ, and κ that were already given by S. If the verification is passed, P can trust C and so replies to C in step 528 with a confirm message that contains a MAC of ν that is computed with κ. Upon receiving the message, the client C trusts P since it can verify in step 530 the MAC of the message with κ that was given by S.

Finally, the TSAF authentication process between C, S, and P is completed and subsequently C can start trusted communications with P for EV charging control. Note that once the authentication token is installed at C's KoB, all data related to C is immediately removed from S (step 532).

One major goal of the TSAF design is to prevent the theft of client-side secret data. We first described, in the context of FIG. 6, details of KoB access logic that are designed as base blocks to achieve this goal.

Recall that A KoB comprises a PUF, an ECDH symmetric key generator, a public key generator, a cryptographic hash function (i.e., SHA-256), and non-volatile memory such as flash memory, as shown in FIG. 4. Note that each KoB has its own computation capability independent of its attached client device and does not use the client's memory for its internal computations.

For a client C with identity id and an authentication server S, C's KoB keeps and manages the following information: (1) an authentication token Ta that is most recently issued by S, (2) a PUF code pc that is derived from a private key rk (See GPK in FIG. 6), and (3) the public key $pk_S$ of S. For a KoB, reading information from it or writing information into it are by design available only using the following KoB access logic: Read-Current-Authentication-Token RCT, Generate-Public-Key GPK 610, Compute-Shared-Secret CSS 620, Compute-Session-Key CSK 630, Write-First-Authentication-Token WFT 640, Update-Authentication-Token-Only UTO 650, and Update-Authentication-Token-With Code UTC 660. Note that as CSS is built only for internal use, it is not exposed to KoB's user. Once $T_{id}$, pc, and $pk_S$ are written for the first time into C's KoB, Tia and pc can be subsequently refreshed. However, $pk_S$ is not refreshed. For perfect forward secrecy, $pk_S$ can be refreshed by using a digital signature scheme. However, here we omit its refreshment for simplicity of presentation.

Intensive physical attacks against C's KoB may cause the exposure of the information that the KoB holds. However, adversaries have no meaningful benefit from the theft of the data since $T_{id}$, pc, and $pk_S$ are not secret.

Figure 6:
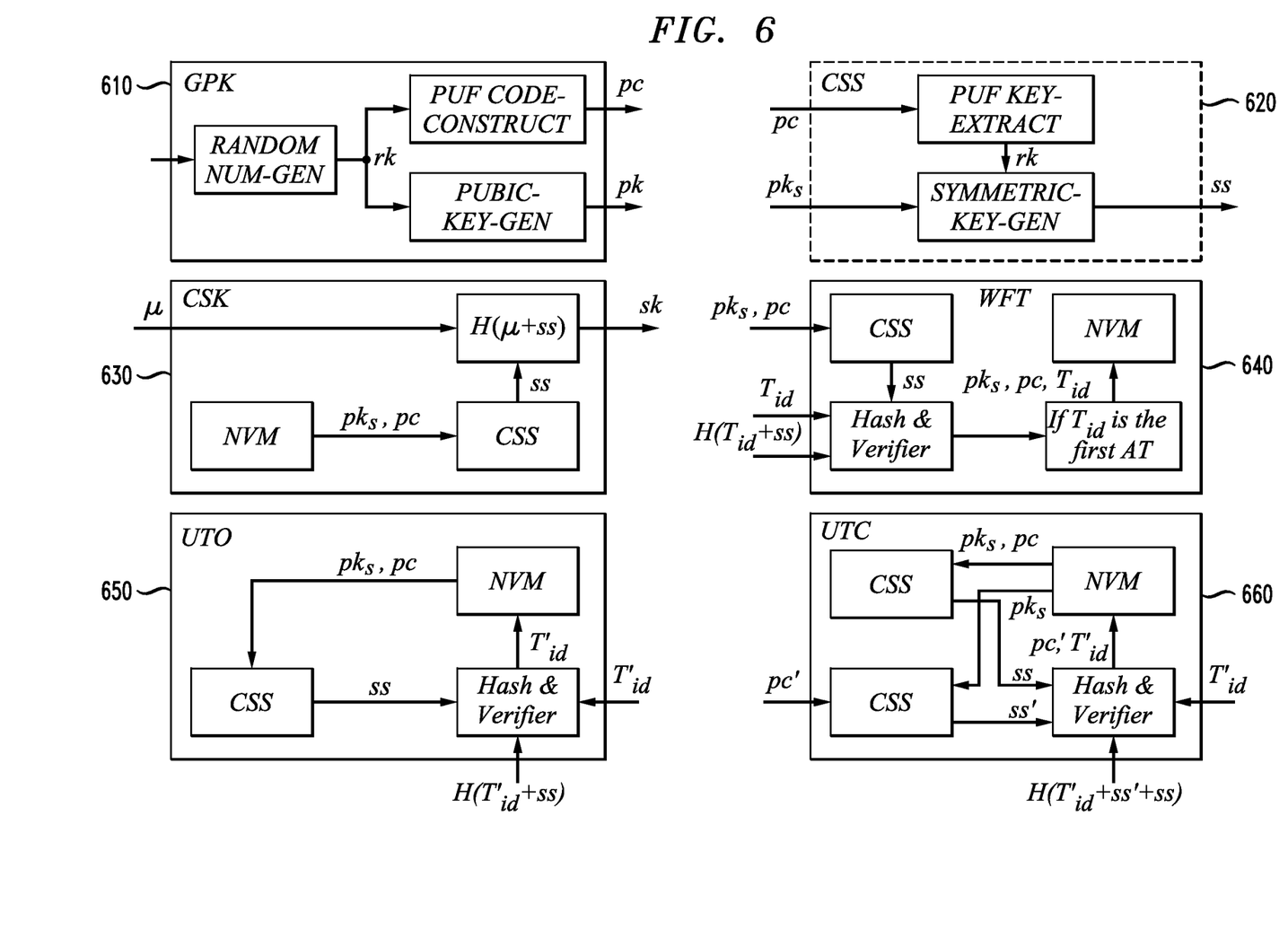
FIG. 6 illustrates access logic for a client key obfuscation block, according to an embodiment of the invention.

Note that a KoB does not persistently keep its secrets; instead, if necessary, it computes the secrets. In one embodiment, we utilize the properties of PUFs that have been described above. Specifically, GPK 610 and CSS 620 are built with PUF's two primitives, code construction and key extraction, as shown in FIG. 6. Please refer to NXP, "Protecting Next-generation Smart Card ICs with SRAM-based PUFs," 2013, at www.nxp.com/documents/other/75017366.pdf, for the details of the PUF primitives.

We now discuss the internals of the KoB access logic. It is to be understood that the term "logic" as illustratively used herein includes hardware, software, or combinations thereof.

RCT provides its caller with an authentication token $T_{id}$ that is currently stored in the NVM.

GPK (610) first creates a random number rk (as a private key of its caller). For the random number rk, it then generates a public key pk and a PUF code pc using PUF code construction.

CSS (620): for one input pc, it first computes a private key rk using PUF key extraction (recall that a KoB keeps no secret data). For the computed secret key rk and the other input public key $pk_S$, CSS then computes a shared secret ss with the ECDH key generator. Again, CSS is for the internal use since otherwise ss may be exposed to adversaries that can compromise clients.

CSK (630): for one input nonce it returns a session key sk that its caller C will use to verify messages from C's AS. The session key sk is computed as follows: sk=H(μ+ss) where ss is a shared secret that CSS computes for a PUF code pc (stored in the NVM) and a public key $pk_S$ (already given by S).

WFT (640): for four inputs, $T_{id}$, pc, $pk_S$, and h=H($T_{id}$+ss), it first produces a shared secret ss from $pk_S$ and pc (a PUF code created by GPK) using CSS, and then computes a hash value of $T_{id}$ and ss. Subsequently, the hash value is compared with h; if the two values are equals and no authentication token exists in the NVM, WFT can trustworthily execute the first write of $T_{id}$, pc, and $pk_S$ into the NVM; otherwise, it does nothing.

UTO (650): for two inputs, $T'_{id}$ and h=H($T'_{id}$+ss), where $T'_{id} \neq T_{id}$, in the same manner that WFT computes a shared secret, UTO first computes a shared secret ss for a current PUF code pc that is stored in the NVM (see FIG. 6), and then calculates a hash value of $T'_{id}$ and ss. Subsequently, the hash value is compared with h; if the two values are equals, UTO can trustworthily update the NVM with new authentication token $T'_{id}$. For a client id's KoB, updating data in it must be available only using either UTO or UTC since, if an adversary can decode $T_{id}$ and update $pk_S$ in it, he/she may develop server impersonations against client id. However, for certain data in a SoC (System-on-a-Chip), unauthorized update is known to be extremely hard, compared to unauthorized read. It requires full knowledge about the SoC's internal structure and the data's precise location in the SoC. However, no existing attack is known to be able to get such knowledge against present SoC technologies.

UTC (660): for inputs, $T'_{id}$, pc', and h=H($T'_{id}$+ss'+ss), where $T'_{id} \neq T_{id}$, pc'≠pc, and ss'≠ss, in the same manner that WFT computes a shared secret, UTC first computes two shared secrets, one shared secret ss for a current PUF code pc (stored in the NVM) and the other shared secret ss' for new PUF code pc' (generated by GPK, as shown in FIG. 6). A hash value of $T'_{id}$, ss', and ss is then computed and so compared with h; if the two are equal, UTC can trustworthily update the NVM with both the new authentication token $T'_{id}$ and pc'; otherwise, it does nothing.

For a client C with identity id and an authentication server S, we now describe how the first AT of C is installed to the KoB of C in an off-line manner. Recall that S has a pair of public-private keys ($pk_S$, $rk_S$) and a token master key $mk_S$. S directly asks C of C's public-key pk and a PUF code pc (See GPK in FIG. 6). Once pk and pc are acquired from C, S derives a token key $tk_{id}$ from id (Recall that $tk_{id}$=AES$mk_S$(id)). Now, for a pair of S's private key $rk_S$ and, it executes SECRET ($rk_S$, pk) that produces shared secret ss by ECDH notion. S can so build the first AT $T_{id}$=ENC$_{tkid}$(id+ts+pk+Φ) with $tk_{id}$ where is $T_{id}$'s issued time and Φ is a hash value H(id+ts+pk+$rk_S$). Finally, $T_{id}$, pc, $pk_S$, and a hash value H($T_{id}$+ss) are given to C that has no authentication token yet. For the given inputs, C's KoB checks the validity of $T_{id}$, pc, and $pk_S$, and if the validation is ensured, $T_{id}$, pc, and $pk_S$ are for the first time written to C's KoB (See WFT in FIG. 6). Note that once the authentication token is installed at C's KoB, all data related to C is immediately removed from S.

Figure 7:
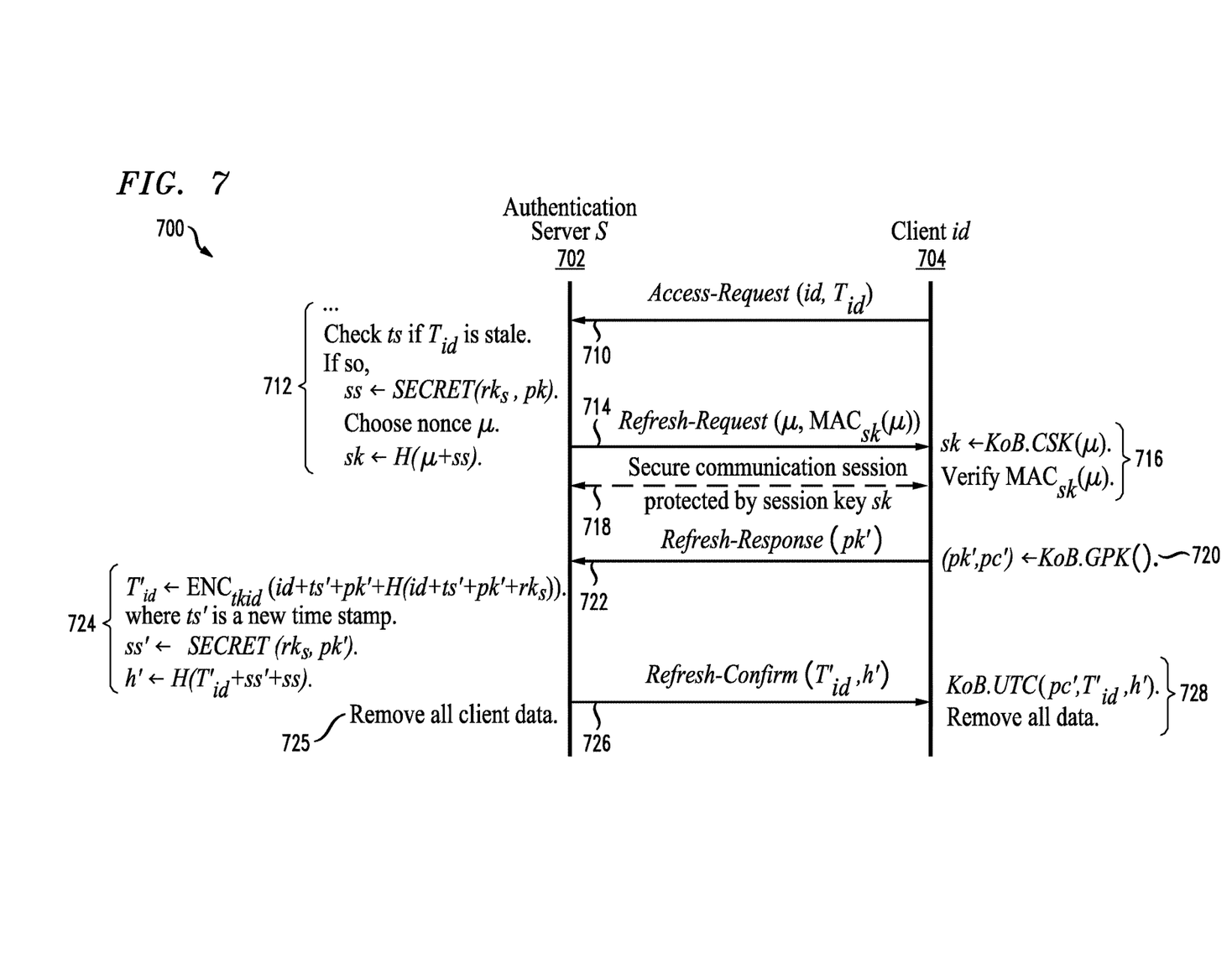
FIG. 7 illustrates a refreshment procedure of a tamper-resistant and scalable mutual authentication methodology, according to another embodiment of the invention.

Leveraged by KoB capabilities described herein, embodiments of the invention effectively reduce the possible secret exposure to physical attacks. It is noted that one cannot completely prevent secrecy exposure that may be caused by improper configuration settings, implementation faults, brute-force attacks, and so on. Thus, for improving secrecy exposure resilience, the existing authentication token $T_{id}$ containing a public key pk of client id is refreshed with a new authentication token $T'_{id}$ containing a new public key pk' of client id, as shown in FIG. 7. As a result, during refreshing the authentication token, the existing shared secret ss (but not kept) between client id and its associated authentication server S is by design replaced with new shared secret ss'. The detailed procedure between an authentication server S (device 702) and a client id (device 704) is as follows.

For a received access-request message received in step 710 that includes $T_{id}$, S checks the time stamp ts of $T_{id}$. This is done in step 712. If the time stamp is too old (stale), S chooses a nonce μ and creates a session key sk in the same manner that the TSAF authentication process of FIG. 5 computes a session key.

Then, a refresh-request message which includes μ and a MAC (created with sk) is sent in step 714 to client id. When client id gets the message, in step 716, it computes session key sk and then verifies the MAC using sk. Once the verification is passed, client id trusts the message's sender (i.e., 5), and will use session key sk for ensuring the confidentiality and integrity of subsequent communications with S (step 718). A secure communication session is created using the session key in a conventional manner.

Client id asks its KoB to generate a new pair of public key and PUF code, pk' and pc' (see the description of GPK above), in step 720. A refresh-response message including pk' is then sent back to S in step 722. On receiving the message, S creates a new authentication token $T'_{id}$=ENC$_{tkid}$(id+ts'+pk'+H(id+ts'+pk'+$rk_S$)) where ts' is a new timestamp, in the same manner that an authentication token is created above. S computes new shared secret ss' from both its own private key $rk_S$ and new public key pk' of client id that $T_{id}$ contains. Recall that we use ECDH to compute the shared secret. Further, for ensuring the integrity of $T'_{id}$, S computes a hash value h'=H($T'_{id}$+ss'+ss). Then, $T'_{id}$ and h' are sent to client id. These operations are performed in step 724. At the same time, in step 725, S removes all information related to client id. Recall that TSAF servers by design keep no state per client.

Once client id receives $T'_{id}$ and h' in step 726, it can trustworthily write the received data and PUF code pc' (previously generated by GPK) into its KoB through UTC, (see the description of UTC above) and then removes all data, in step 728. Finally, the most-recent authentication token $T'_{id}$ is stored in the KoB of client id and new shared secret ss' is established (but not kept) between client id and authentication server S.

Recall that the AS of TSAF has by design no security state for clients. Thus, the AS may be vulnerable to replay attacks. Embodiments of the invention add extensions to protect the AS from this type of attack. First, note that for the AS S and its associated client, a token key is unforgeable and with proper formatting and care, we can prevent adversaries from presenting an authentication token generated for a client id1 as an authentication token for client id2. Further, re-encrypting an authentication token without knowledge of a token key is not possible either. Hence, the only venue of the replay attack is the verbatim replay of one of the previous authentication tokens with a possibly different session message. Recall that each authentication token is encrypted with a token key for its publishing client and so is implicitly tied with the client's identity. As a result, such a replay attack can always be detected in ASs. So, the only replay attack that remains to be considered is the verbatim replay of the entire client's message. In the protection method described herein according to embodiments of the invention, firstly, an AS will reject messages that have an obviously old authentication token through checking the time stamp contained in the token. Next, we need to address the possibility of replay of not too obviously old messages, which might be up to a couple of tens of minutes old (to allow for clock skew). In typical communication settings for EV charging scenarios, the number of authentication request messages that can arrive in the time period of a couple of tens of minutes is not very large, and so we can afford to keep the history of their hashes. Thus, for each new message, we check it against the small recent history of hashes, and reject it if it is found in the history; if not found, we proceed as before.

For a pair of a client and an authentication server, we now recap the security strength of TSAF.

First, a shared secret between the two parties is securely protected as it is never stored in both parties due to the properties of the used key notions: authentication token, KoB, and ECDH. The follow-up cryptographic hashing, message authentication, and message encryption, based on cryptographic algorithms (Advanced Encryption Standard (AES) and Keyed-Hashing for Message Authentication (HMAC)) chosen from the standards, is also secure.

Second, for a pair of the client's private key and the server's private key, if one of the keys is exposed, TSAF becomes vulnerable since the exposure may result in revealing a shared secret that each party computes with its own private key and counter-party's public key (i.e., ECDH). Recall that the client's private key is securely protected as it is by design never kept. By contrast, server private keys have been assumed to be secure as a server is typically enclosed by a physical security perimeter. However, the assumption is vulnerable to security threats caused by compromised server-side personnel, as described above. Thus, a server-side secret protection extension is implemented, e.g., the use of KoB features such as CSS where server private keys are not kept but computed. In the extension, server private keys are securely protected and as a result TSAF becomes secure.

Third, the derivation of short-term session keys from shared secrets and random numbers results in the following benefits. It prevents attackers from developing attacks by passively collecting large amounts of cipher text encrypted with one long-term session key. Furthermore, it provides forward-backward secrecy in the sense that a compromised session key does not compromise other session keys derived from the same shared secret. Another threat possibility is that authentication tokens are decoded by brute-force attacks and replay attacks without the theft of shared secrets may be developed. However, such replay attacks are always detected, as described above.

Figure 8:
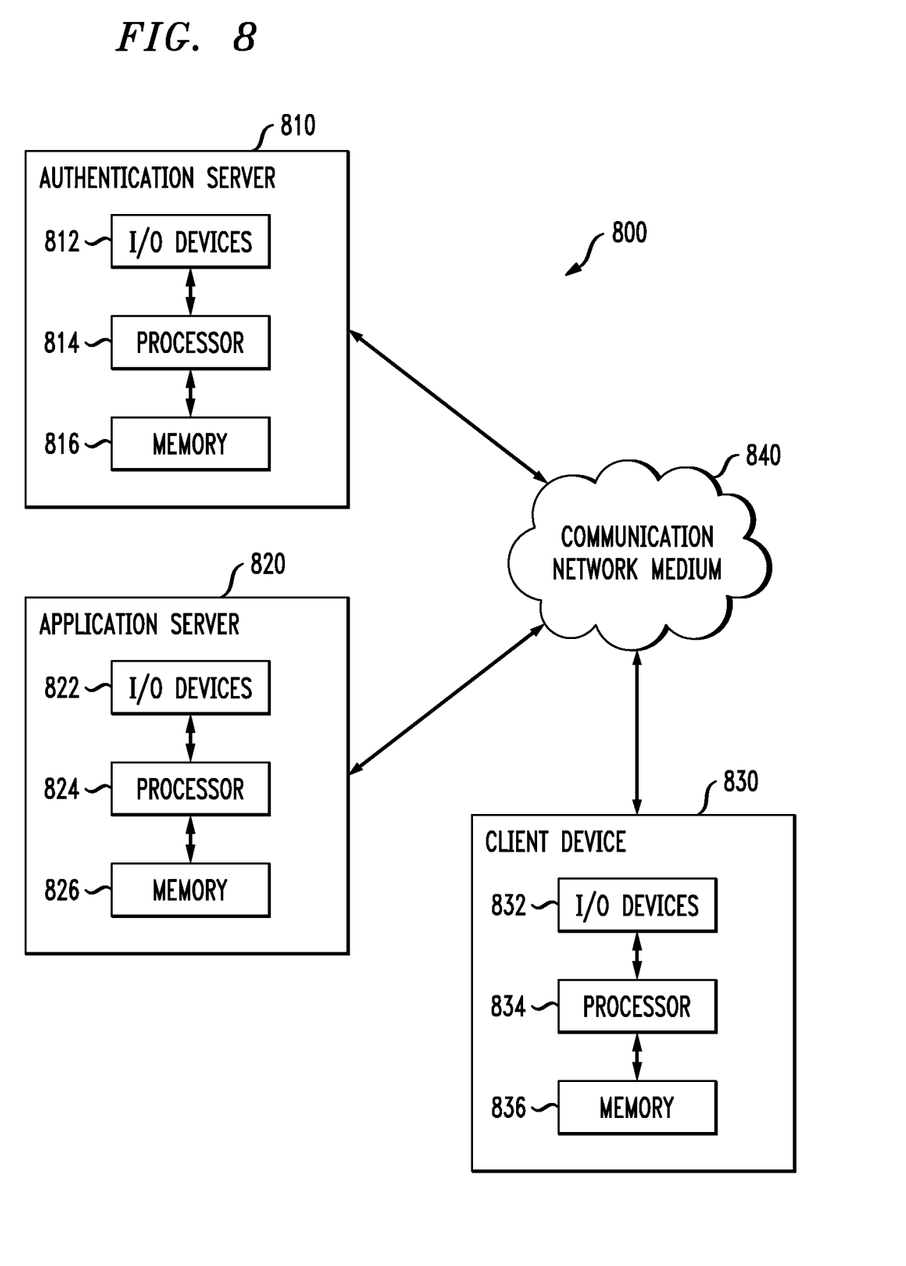
FIG. 8 illustrates a computing architecture of a communication network suitable for implementing a tamper-resistant and scalable mutual authentication methodology, according to an embodiment of the invention.

FIG. 8 illustrates a computing architecture of a communication network 800 suitable for implementing a TSAF methodology, according to one or more embodiments of the invention.

As shown, computing device 810 (e.g., corresponding to authentication server S 502/702), computing device 820 (e.g., corresponding to application server P 504), and computing device 830 (e.g., corresponding to client C 410/420/506/704) are operatively coupled via communication network medium 840. The network medium may be any network medium across which the computing devices are operable to communicate. By way of example, the network medium can be any medium that is part of the World Wide Web. However, embodiments of the invention are not limited to a particular type of network medium.

Note that two or more of the computing devices 810, 820 and 830 represent M2M devices.

As would be readily apparent to one of ordinary skill in the art, the servers, clients, components, network elements and other computing devices may be implemented as programmed computers operating under control of computer program code. The computer program code would be stored in a non-transitory computer (or processor or machine) readable storage medium (e.g., a memory) and the code would be executed by a processor of the computer. Given this disclosure of various illustrative embodiments of the invention, one ordinarily skilled in the art could readily produce appropriate computer program code in order to implement the protocols described herein. The phrase "computer (or processor or machine) readable storage medium" is understood to exclude transitory signals.

Nonetheless, FIG. 8 generally illustrates an exemplary architecture for each device communicating over the network medium. As shown, computing device 810 comprises I/O devices 812, processor 814, and memory 816. Computing device 820 comprises I/O devices 822, processor 824, and memory 826. Computing device 830 comprises I/O devices 832, processor 834, and memory 836.

It should be understood that the term "processor" as used herein is intended to include one or more processing devices, including a central processing unit (CPU) or other processing circuitry, including but not limited to one or more signal processors, one or more integrated circuits, and the like. Also, the term "memory" as used herein is intended to include memory associated with a processor or CPU, such as RAM, ROM, a fixed memory device (e.g., hard drive), or a removable memory device (e.g., diskette or CDROM). In addition, the term "I/O devices" as used herein is intended to include one or more input devices (e.g., keyboard, mouse) for inputting data to the processing unit, as well as one or more output devices (e.g., computer display) for providing results associated with the processing unit.

Accordingly, software instructions or code for performing the methodologies of the invention, described herein, may be stored in one or more of the associated memory devices, e.g., ROM, fixed or removable memory, and, when ready to be utilized, loaded into RAM and executed by the CPU. That is, each computing device (810, 820, and 830) shown in FIG. 8 may be individually programmed to perform their respective steps of the methodologies and protocols depicted in FIGS. 1 through 7.

Advantageously, as illustratively described herein, we view the EV authentication problem as a mutual-authentication problem within a mobile and hostile machine-to-machine (M2M) communication setting. We describe a mutual authentication system tamper-resistant and scalable mutual authentication framework, or TSAF, that can support large-scale grid-connected EV charging. The proposed TSAF is based on at least two key notions, authentication token (AT) for stateless authentications and key obfuscation block (KoB) for protecting authentication key information of client devices. Stateless implies that information at an authentication server is independent on the number of serviced clients. Note that TSAF is addresses mobility, tamper-resistance, key exposure resilience, low complexity, and ease of management for plug-in EV charging.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method, comprising:
sending an authentication request message from a first computing device to a second computing device, wherein the first computing device and the second computing device communicate via a machine-to-machine communication protocol, and wherein the authentication request comprises a token issued by the second computing device and stored in a key obfuscation block of the first computing device;
receiving a challenge message at the first computing device from the second computing device, the challenge message comprising a first value selected by the second computing device and a second value selected by the second computing device that is encrypted utilizing a session key;
in response to the challenge message, computing the session key at the key obfuscation block of the first computing device, wherein the session key is computed based on a secret shared between the first computing device and the second computing device;
upon generating the session key, the first computing device extracting the second value from the challenge message and generating an authentication delegate based on the extracted second value, the authentication delegate comprising the first value and a third value selected by the first computing device that are encrypted utilizing the second value; and
sending the authentication delegate from the first computing device to a third computing device for verification to allow the first computing device access to the third computing device.

2. The method of claim 1, wherein the authentication request also comprises an identity of the first computing device.

3. The method of claim 1, wherein the token comprises a cipher-text that at least contains the identity of the first computing device, the time that the token was issued by the second computing device, and a public key of the first computing device.

4. The method of claim 3, wherein the cipher-text is encrypted with a token key associated with the first computing device.

5. The method of claim 1, wherein the first computing device is issued the token by the second computing device offline.

6. The method of claim 1, wherein the first computing device is issued the token by the second computing device over the machine-to-machine communication protocol.

7. The method of claim 1, wherein the key obfuscation block further comprises a read current authentication token interface.

8. The method of claim 1, wherein the key obfuscation block further comprises a generate public key interface.

9. The method of claim 1, wherein the key obfuscation block further comprises a compute session key interface.

10. The method of claim 1, wherein the key obfuscation block further comprises a write first authentication token interface.

11. The method of claim 1, wherein the key obfuscation block further comprises an update authentication token only interface.

12. The method of claim 1, wherein the key obfuscation block further comprises an update authentication token with code interface.

13. The method of claim 1, further comprising refreshing the secret shared between the first computing device and the second computing device.

14. An article of manufacture comprising a processor-readable storage medium storing one or more software programs which when executed by a processor perform the steps of the method of claim 1.

15. A method, comprising:
receiving an authentication request message from a first computing device at a second computing device, wherein the first computing device and the second computing device communicate via a machine-to-machine communication protocol, and wherein the authentication request comprises a token issued by the second computing device and stored in a key obfuscation block of the first computing device;
decrypting the token and verifying the integrity of the token at the second computing device;
upon token integrity verification, computing a session key at the second computing device, wherein the session key is computed based on a secret shared between the first computing device and the second computing device;
sending a challenge message to the first computing device from the second computing device, the challenge message comprising a first value selected by the second computing device and a second value selected by the second computing device that is encrypted utilizing the session key; and
sending information for authentication delegation from the second computing device to a third computing device to allow the first computing device access to the third computing device, the information for authentication delegation comprising the first value and the second value.

16. The method of claim 15, wherein the information for authentication delegation further comprises an identity of the first computing device.

17. The method of claim 15, further comprising the second computing device removing data associated with the first computing device.

18. An article of manufacture comprising a processor-readable storage medium storing one or more software programs which when executed by a processor perform the steps of the method of claim 15.

19. An apparatus, comprising:
a memory; and
a processor coupled to the memory, wherein the memory and processor are associated with a first computing device that is in machine-to-machine communication with a second computing device, and wherein the memory and processor are configured to:
send an authentication request message from the first computing device to the second computing device, wherein the authentication request comprises a token issued by the second computing device and stored in a key obfuscation block of the first computing device;

receive a challenge message at the first computing device from the second computing device, the challenge message comprising a first value selected by the second computing device and a second value selected by the second computing device that is encrypted utilizing a session key;

in response to the challenge message, compute the session key at the key obfuscation block of the first computing device, wherein the session key is computed based on a secret shared between the first computing device and the second computing device;

upon generating the session key, the first computing device extracting the second value from the challenge message and generating an authentication delegate based on the extracted second value, the authentication delegate comprising the first value and a third value selected by the first computing device that are encrypted utilizing the second value; and sending the authentication delegate from the first computing device to a third computing device for verification to allow the first computing device access to the third computing device.

20. The apparatus of claim 19, wherein the first computing device comprises a client device associated with an electric vehicle.

21. An apparatus, comprising:
a memory; and
a processor coupled to the memory, wherein the memory and processor are associated with a second computing device that is in machine-to-machine communication with a first computing device, and wherein the memory and processor are configured to:
receive an authentication request message from the first computing device at the second computing device, wherein the authentication request comprises a token issued by the second computing device and stored in a key obfuscation block of the first computing device;
decrypt the token and verify the integrity of the token at the second computing device;
upon token integrity verification, compute a session key at the second computing device, wherein the session key is computed based on a secret shared between the first computing device and the second computing device;
send a challenge message to the first computing device from the second computing device, the challenge message comprising a first value selected by the second computing device and a second value selected by the second computing device that is encrypted utilizing the session key; and
send information for authentication delegation from the second computing device to a third computing device to allow the first computing device access to the third computing device, the information for authentication delegation comprising the first value and the second value.

22. The apparatus of claim 21, wherein the second computing device comprises an authentication server associated with a grid charging infrastructure.

23. A method, comprising:
authenticating a client device associated with an electric vehicle by an authentication server associated with a grid charging infrastructure, wherein the client device and the authentication server communicate via a machine-to-machine communication protocol, and wherein the authentication comprises use of a token issued by the authentication server and stored in a key obfuscation block of the client device, such that, once the client device is authenticated via the token, the client device is able to access a charging station associated with the grid charging infrastructure;

wherein authentication the client device comprises:
receiving a challenge message at the client device from the authentication server, the challenge message comprising a first value selected by the authentication server and a second value selected by the authentication server that is encrypted utilizing a session key;

in response to the challenge message, the client device computing the session key at the key obfuscation block, wherein the session key is computed based on a secret shared between the client device and the authentication server;

upon generating the session key, the client device extracting the second value from the challenge message and generating an authentication delegate based on the extracted second value, the authentication delegate comprising the first value and a third value selected by the client device that are encrypted utilizing the second value; and sending the authentication delegate from the client device to the charging station for verification to allow the client device access to the charging station.

24. The method of claim 1, wherein the key obfuscation block of the first computing device is configured to compute the secret shared between the first computing device and the second computing device in response to receiving the challenge message from the second computing device, the secret shared between the first computing device and the second computing device not being stored by the key obfuscation block of the first computing device.

* * * * *